United States Patent
Hammerum

(10) Patent No.: US 9,810,199 B2
(45) Date of Patent: Nov. 7, 2017

(54) SHUTDOWN CONTROLLER FOR A WIND TURBINE AND A METHOD OF SHUTTING DOWN A WIND TURBINE

(71) Applicant: VESTAS WIND SYSTEMS A/S, Aarhus N (DK)

(72) Inventor: Keld Hammerum, Hadsten (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 612 days.

(21) Appl. No.: 14/359,172

(22) PCT Filed: Nov. 21, 2012

(86) PCT No.: PCT/DK2012/050427
§ 371 (c)(1),
(2) Date: May 19, 2014

(87) PCT Pub. No.: WO2013/075720
PCT Pub. Date: May 30, 2013

(65) Prior Publication Data
US 2014/0334927 A1  Nov. 13, 2014

Related U.S. Application Data

(60) Provisional application No. 61/561,946, filed on Nov. 21, 2011.

(30) Foreign Application Priority Data

Nov. 21, 2011  (DK) ................................. 2011 70632

(51) Int. Cl.
| | | |
|---|---|---|
| G05D 3/12 | (2006.01) | |
| G05D 5/00 | (2006.01) | |
| G05D 9/00 | (2006.01) | |
| G05D 11/00 | (2006.01) | |
| B64C 11/00 | (2006.01) | |
| B64C 27/00 | (2006.01) | |

(Continued)

(52) U.S. Cl.
CPC ......... *F03D 7/0264* (2013.01); *F03D 7/0224* (2013.01); *F03D 7/042* (2013.01);
(Continued)

(58) Field of Classification Search
None
See application file for complete search history.

(56) References Cited

U.S. PATENT DOCUMENTS

2004/0201220 A1  10/2004  Andersen et al.
2006/0002791 A1  1/2006  Moroz
(Continued)

FOREIGN PATENT DOCUMENTS

| CN | 102042166 A | 5/2011 |
| EP | 2211055 A1 | 7/2010 |
| EP | 2458204 A1 | 5/2012 |

OTHER PUBLICATIONS

International Search Report for PCT/DK2012/050427, Jun. 18, 2013.
Danish Search Report for PA 2011 70632, Sep. 5, 2012.

*Primary Examiner* — Mohammad Ali
*Assistant Examiner* — Md Azad
(74) *Attorney, Agent, or Firm* — Patterson + Sheridan, LLP

(57) ABSTRACT

A shutdown controller for a wind turbine comprises, to improve the estimation of a state of the wind turbine, at least two sensors being adapted to provide sensor data significant for different mechanical states in the wind turbine. The controller can provide an estimated state of the wind turbine based on the sensor data from the at least two sensors and compare the state of the wind turbine with a predefined detection limit to provide a shutdown signal if the estimated state is outside the detection limit.

19 Claims, 3 Drawing Sheets

(51) Int. Cl.
*F03D 9/00* (2016.01)
*F03D 7/02* (2006.01)
*F03D 7/04* (2006.01)

(52) U.S. Cl.
CPC ........ *F03D 7/045* (2013.01); *F05B 2270/327* (2013.01); *F05B 2270/328* (2013.01); *F05B 2270/331* (2013.01); *F05B 2270/332* (2013.01); *F05B 2270/334* (2013.01); *Y02E 10/723* (2013.01)

(56) References Cited

U.S. PATENT DOCUMENTS

| | | | |
|---|---|---|---|
| 2009/0261588 A1 | 10/2009 | Von Mutius et al. | |
| 2009/0300134 A1* | 12/2009 | Smith | G06F 9/50 709/216 |
| 2011/0084485 A1 | 4/2011 | Miranda et al. | |
| 2011/0142634 A1* | 6/2011 | Menke | F03D 7/0224 416/46 |
| 2011/0158805 A1 | 6/2011 | Miranda et al. | |
| 2012/0134803 A1* | 5/2012 | McGrath | F03D 7/0252 416/1 |
| 2013/0134711 A1* | 5/2013 | Spruce | F03D 7/0224 290/44 |
| 2013/0214535 A1* | 8/2013 | Brath | F03D 7/0264 290/44 |
| 2013/0297085 A1* | 11/2013 | Xiongzhe | F03D 7/0276 700/287 |

\* cited by examiner

SHUTDOWN CONTROLLER FOR A WIND TURBINE AND A METHOD OF SHUTTING DOWN A WIND TURBINE

INTRODUCTION

The invention relates to a shutdown controller for a wind turbine.

BACKGROUND OF THE INVENTION

Shutdown controllers and load controllers generally, are applied in wind turbines for protecting the tower, blades, transmission, generator and other components against structural overload.

The load on a wind turbine structure mainly derives from wind pressure on the rotor plane and tower. Accordingly, the load depends on the wind speed, turbulence, wind density, and various settings including blade pitch angle and yaw angle. The latter expresses the angle of the rotor shaft relative to the direction of the wind.

The loads are traditionally measured by various sensors which measure various mechanical states of the turbine, herein referred to as mechanical-state-sensors.

Examples of such sensors include sensors for sensing rotational speed, oscillation level e.g. measured as tower acceleration, blade load e.g. measured by strain gauges fixed in the blade root, and blade pitch angle sensors determining the angle of attack of the wind and thus the degree of wind energy to rotor energy conversion which can take place.

Conventional turbine shutdown is based on unitary sensor inputs where one sensor signal measures a state, e.g. rotor speed, and a shutdown is initiated when the signal reaches a predetermined limit.

DESCRIPTION OF THE INVENTION

It is an object of the invention to provide improved protection of wind turbines against control system failures and structural overloading. This includes protection against systematic faults such as software faults.

Accordingly, the invention, in a first aspect, provides a shutdown controller for a wind turbine, the controller comprising at least two sensors being adapted to provide sensor data significant for different mechanical states in the wind turbine, the controller being adapted to provide an estimated state of the wind turbine based on the sensor data from the at least two sensors, wherein the controller is adapted to compare the state of the wind turbine with a predefined detection limit and to provide a shutdown signal if the estimated state is outside the predefined detection limit.

Compared to unitary sensor input, the shutdown controller according to the invention can reduce the structural overhead needed for accommodating fault scenarios.

Herein "mechanical states" should generally be understood as mechanical states and derivatives. Mechanical states are defined as states of the structure of the wind turbine without limitations to specific areas of the turbine. By way of examples, the mechanical states could be strains in the tower, blades, rotor, hub, or anywhere in the wind turbine, temperature of the wind turbine or even temperature in the vicinity of the wind turbine, velocity, acceleration and/or oscillation of structural elements such as the tower, rotor, or blades etc.

Herein, the mechanical state of the turbine will be denoted by a state vector x. According to the invention, this state vector x is determined based on input from several sensors, e.g. a combination of one or more sensor signal which provide e.g. the rotor speed $\omega_R$, the pitch angle $\theta$, the tower deflection $y_t$, or the blade deflection $\beta$, etc.

It is evident that that structural hazards are closely related to the state vector x. For instance, the value of the tower top deflection $y_t$ is closely related to the loads on the tower. Similarly, the rotational speed $\omega_R$ is governing a large set of loads on the turbine. The notion of a state space motivates the introduction of an admissible state space $X_A$. This is the state space in which the loads on the turbine are within the design limits.

In general for feedback control schemes, the control vector is a function of the state vector x. In practice, this is implemented by using an estimate of the state, obtained either by measurements (sensors) or by model-based estimators (e.g. observers).

Accordingly, the invention provides an improved shutdown controller going from 1-d (one dimensional) to N-d (multi-dimensional) thereby facilitating improved protection compared to the state of art shutdown controllers for wind turbines.

The detection limit may be expressed as a hull, e.g. a convex hull. A convex hull has the advantage that it eases the online determination of whether the state vector is inside the hull or not, e.g. by solving a linear program.

Accordingly, the controller may particularly be adapted to determine whether the state of the wind turbine is within or outside the convex hull by solving a linear program, e.g. including the use of a simplex algorithm.

Generally, the shutdown controller may be applied in any kind of wind turbine. However, advantageously, the controller is applied in a horizontal axis wind turbine. The claimed at least two sensors which are adapted to provide sensor data significant for different mechanical states in the wind turbine could be of a kind generally known in wind turbine control, and they may include e.g. blade bending sensors, e.g. light sensors etc., rotor speed sensors, rotor bending sensors, tower acceleration sensors, wind speed sensors, power production sensors, transmission loading sensors etc.

The way the shutdown controller compares the state of the wind turbine with a predetermined detection limit will be described in further details with reference to the drawings later.

Generally, wind turbines are controlled by various control functions implemented physically in one or more computer units. Herein, we refer generally to "wind turbine controller" as a combination of all control functions taking place in a wind turbine, e.g. control of loads, control of power production and grid compliance, control of noise emission, etc. The shutdown controller according to this invention may form an integrated part of the existing controller or one of the existing controllers in the wind turbine, or it may form a separate unit in the wind turbine.

The detection limit may be defined based on the structural properties of the turbine along with the capabilities of the shutdown mechanism e.g. the pitching speed during shutdown.

Further, the controller may include communication means, e.g. based on wireless communication, such that the controller can communicate with a blade pitching device and initiate shutdown by blade pitching.

The communication may also allow the controller to set the speed of a pitching device. The speed could either be a fixed speed which remains during the pitching of the blade, or the speed could be a variable speed, i.e. a speed which is changed during the blade pitching. The variable speed could be a stepwise variable speed or an infinitely variable speed.

It may be an advantage to pitch the blade individually, e.g. to counteract wind shear etc. The shutdown controller according to the invention may communicate pitching signals with the pitching device for several blades individually such that the blades can be pitched e.g. depending on wind shear or depending on sensor signals measure on individual blades.

Additionally, the communication may allow the shutdown controller to set a yaw angle of the turbine, the load on the electrical generator in the wind turbine etc.

Since the controller is a shutdown controller, it should be stable and reliable also in emergency situation where fast shutdown is necessary. For that purpose, the controller and any communication means to the pitching device should be emergency powered, e.g. by battery etc. For that purpose, also the pitching device should be emergency powered or the structure of the pitching device and blades should be such that the blades will feather upon failure in power supply or upon failure in the communication with the controller according to this invention.

The detection limit $X_D$ may depend on the constraints applicable to the shutdown strategy. The detection limit may be defined based on a constraint including a fixed speed by which blades of the wind turbine can be pitched by the blade pitching device, or based on a variable speed, e.g. based on the pitching speed or acceleration of the blades. For that purpose, the detection limit may be defined such that the obtainable speed by which blades of the wind turbine can be pitched by the blade pitching device is taken into consideration. I.e. a slowly reacting blade pitching device may require a smaller detection limit $X_D$.

The detection limit may generally be defined based on different measurements including but not limited to pitch angle, e.g. individual pitch angle for each blade of the wind turbine, rotor speed $\omega_R$, pitch angle $\theta$, tower deflection $y_t$, and blade deflection $\beta$. The detection limit may be adaptively adjusted based on historical data such as a number of events of a particular kind, e.g. a number of excessive loads, a number of revolutions of the rotor, age of the turbine etc.

The controller may e.g. be adapted to operate with a control scheme which specifies the detection limit and/or a shutdown pitching strategy for the wind turbine. The shutdown pitching strategy may e.g. specify a speed or acceleration profile for blade pitching, or it may specify if the blades should be pitched simultaneously or individually.

The controller may be adapted to select between different control schemes which are predefined for the wind turbine. The selection may be based on the age of the turbine or based on the amount of events where the admissible state space has been exceeded.

The control scheme or at least the detection limit may be adaptively adjusted based on events on the wind turbine. By adaptively adjusted is herein meant that it is either continuously changed or stepwise changed with certain intervals. The adjustment could be based on age of the wind turbine and/or based on experienced loads, e.g. extreme loads. As an example, a load history may be recorded, analysed and used for such adaptation.

In one embodiment, a number of experienced loads above a predefined limit is counted and the number is used for selecting a suitable control scheme. In another embodiment, a fatigue load history is determined from the historic load data, and the control scheme is selected there from.

In a second aspect, the invention provides a method of shutting down a wind turbine, the method comprising providing at least two different sets of data, the sets being significant for different mechanical states in the wind turbine, the method comprising providing from the at least two different sets of data, a state of the wind turbine and shutting the wind turbine down based on a comparison between the state of the wind turbine and a predetermined detection limit.

The detection limit may be defined based on the structural properties of the turbine, e.g. the strength of key components along with the capabilities of the shutdown system e.g. the maximum pitching speed during shutdown, the ability to perform pitching for the blades individually, the ability to control the speed or acceleration of the pitching etc.

The method may comprise the steps of:
determining the detection limit as a convex hull; and
determining if the state of the wind turbine is within the hull by solving a linear program.

The solving of the linear program may particularly involve the use of a simplex algorithm.

Generally, the method may include any step implicit in the controller according to the first aspect.

BRIEF DESCRIPTION OF THE DRAWINGS

The invention will now be described by way of an example with reference to the following figures in which:

FIG. 2 illustrates a multidimensional detection limit $X_D$ according to the invention and which allows for earlier detection of the trajectory $x_N$ leaving the normal space $X_N$, hereby keeping the state trajectory inside the admissible space $X_A$;

DETAILED DESCRIPTION OF EMBODIMENTS

Figure 1:
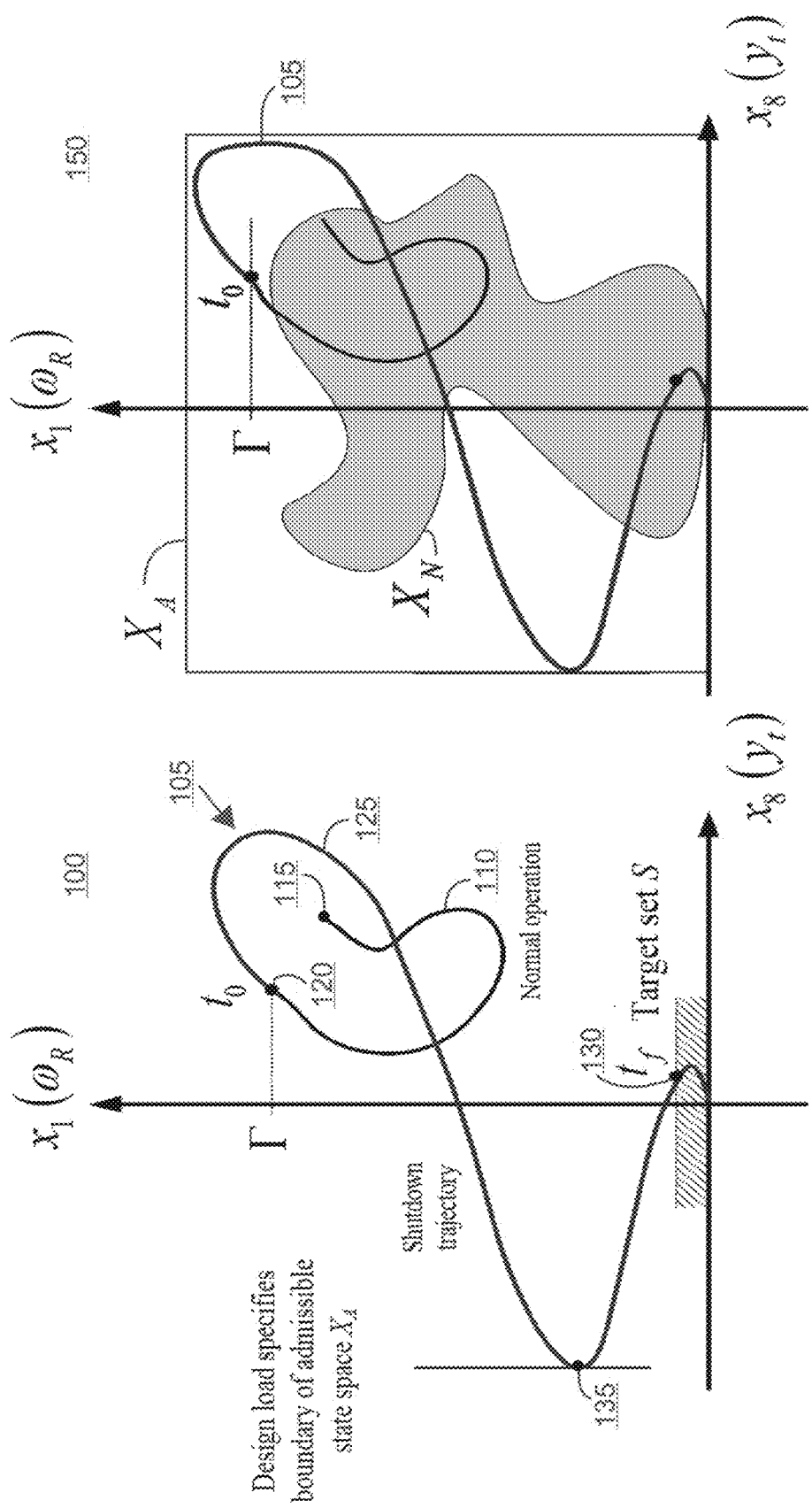
FIG. 1 illustrates a safety-related control function activated at time $t_0$, bringing the state vector to the target set S (standstill) at time $t_f$. Right: graphical illustration of the normal operating space $X_N$ and the admissible state space $X_A$.

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

The estimated state of the turbine is herein referred to as the information needed to predict future states given future inputs. As already mentioned, this will be denoted by a vector x. This vector contains quantities like rotor speed $\omega_R$, pitch angle $\theta$, tower deflection $y_t$, and blade deflection $\beta$.

In addition to the state vector, a vector u of control signals is defined. For variable speed, pitch-controlled turbines, this vector includes individual pitch angle references and the power reference for the power conversion system.

In general for feedback control schemes, the control vector is a function of the state vector x. In practice, this is implemented by using an estimate of the state, obtained either by measurements (sensors) or by model-based estimators (e.g. observers).

In normal operation with a non-faulty controller, the functional relationship between the state vector and the control vector is denoted $U_N$.

In summary, we have:

$$x \equiv [\omega_R \quad \theta_i \quad \dot{\theta}_i \quad y_i \quad \dot{y}_i \quad \beta_i \quad \dot{\beta}_i \quad \ldots]^T$$

$$u \equiv [\theta_{i,ref} \quad P_{ref_i}]^T$$

$$i = 1, 2, 3$$

$$u_N(t) = U_N(\hat{x}, t)$$

It is evident that that structural hazards are closely related to the state vector x. For instance, the value of the tower top deflection $y_t$ is closely related to the loads on the tower. Similarly, the rotational speed $\omega_R$ is governing a large set of loads on the turbine. The notion of a state space motivates the introduction of an admissible state space $X_A$. This may e.g. be defined as the state space in which the loads on the turbine are within the design limits or within limits which are defined for the wind turbine.

In normal operation the state vector x will follow a trajectory governed by the normal control scheme. Let this trajectory be denoted $x_N(t)$. The normal control scheme is optimized to provide the optimal trade-off between energy production, power quality, fatigue loads, and extreme loads:

$$u(t) = U_N(\hat{x}(t), t)$$

$$J_N = f(\ldots)$$

s.t.

$$x \in X_A$$

$$|\dot{\theta}_i| \geq k, i = 1, 2, 3$$

$$P_{ref} \leq \overline{P}$$

Above, the function $f$ denotes a complex function for the cost $J_N$. In addition, the scheme is subject to constraints for the pitch speeds and power reference as implied by the constraints above.

The trajectory should preferably be inside the admissible state space $X_A$ to avoid structural overloading. The space spanned by normal operation will be denoted $X_N$.

As a result of the above, the overall requirement for the safety-related control functions is to keep the state vector within the admissible state space $X_A$:

$$x(t) \in X_A$$

The normal operation trajectory $x_N(t)$ is per definition inside the admissible state space:

$$x_N(t) \in X_N \subset X_A$$

Therefore, one solution would be to designate the normal control scheme as safety-related and implement all sensors, logic, and actuators using the principles required for safety-related applications, cf. the relevant functional safety standards.

This solution is over-conservative, though, as trajectories outside $X_N$ will only jeopardize structural integrity if not within $X_A$. In addition, the bounds of $X_N$ constitutes a rather complex shape, adding significantly to the complexity of any algorithm designed for detection of the operating trajectory straying outside the bounds of $X_N$. Finally, updates to the normal control scheme would be likely to change $X_N$. This, in turn, would require costly updates of the safety-related control functions, even though the changed $X_N$ would still be within the admissible space $X_A$.

Now, assume a safety-related control function $U_S$ that protects against risks associated with failure of the normal control function. In general, the objective for such control scheme would be to bring the machine to a standstill within shortest possible time. In optimal control theory, this objective is often defined as taking the state inside the target set S:

$$u(t) = U_S(x(t), t)$$

$$J_N = \int_{t_0}^{t_1} dt = \Delta t, \, t_f = \arg\min_t(x(t) \,|\, x \in S)$$

s.t.

$$\dot{\theta}_1 = \dot{\theta}_2 = \dot{\theta}_3 = k \geq 0$$

$$k \geq \dot{\theta}_1 = \dot{\theta}_2 = \dot{\theta}_3 \geq 0$$

$$k \geq \dot{\theta}_i \geq 0, (i = 1, 2, 3)$$

$$|\dot{\theta}_i| \geq k, (i = 1, 2, 3), \text{ where}$$

$$\dot{\theta}_1 = \dot{\theta}_2 = \dot{\theta}_3 = k \geq 0, k \geq \dot{\theta}_1 = \dot{\theta}_2 = \dot{\theta}_3 \geq 0,$$

$$k \geq \dot{\theta}_i \geq 0, (i = 1, 2, 3), \text{ and } |\dot{\theta}_i| \geq k, (i = 1, 2, 3),$$

represent different sets of constraints implying increasing actuator complexity.

In the formulation above, different sets of constraints are stated to exemplify that the constraints for the safety-related control functions can differ from the constraints imposed on the normal control system. The first constraint implies that only collective, constant-speed pitching is allowed, whereas the last constraint allows individual pitch control with positive and negative action within the maximum speed k. For wind turbines using an accumulator-powered, hydraulic circuit for the safety related actuation of the blade pitch, the blade pitch rates are often constrained to be non-negative during a shutdown. Combining this with the ability to control the emergency pitching individually for each blade results in the third line of constraints above. In general, wide constraints on the pitch action can be expected to provide more optimal trajectories, with the cost being increased complexity. On the other hand, tight constraints (e.g. collective, constant-rate pitching) decreases complexity, but requires more load-wise headroom for shutdown scenarios.

The terms and mechanisms described above can be illustrated as shown in FIG. 1.

The diagram 100 in the left-hand side shows a two-dimensional view of a state trajectory 105, with rotor speed $\omega_R$ and tower deflection $y_t$ as its axes. A first portion 110 of the state trajectory 105 (defined between point 115 and point 120) represents operation with the turbine being controlled by the normal controller. Now, assume that the rotational speed exceeds a predefined speed limit Γ, activating a safety-related control function—in this case represented by a simple over-speed guard. The safety related control function orchestrates a turbine shutdown, bringing the turbine to the target set S (e.g. standstill). Note the slingshot behaviour implying that the inherent structural dynamics govern the path by which the state can be taken to the target set. The turbine tower exhibits oscillatory behaviour during the shutdown, indicated by a second portion 125 of the state trajectory 105 (defined between point 120 and point 130) spanning a wide range of tower top deflections $y_t$. In the example, this extreme oscillation is design-driven, indicated by the leftmost point 135 of the second portion 125 defining the boundary of the admissible state space $X_A$.

In diagram 150 in the right-hand side of FIG. 1, a graphical representation of the state space is given, with the space $X_N$ (shaded) representing the space for normal operation. Note that the space $X_N$ has a complex shape, indicating that it is not defined by simple, physical bounds, but by a complex cost function for overall turbine operation. Also, note that $X_N$ does not extend to the boundaries of $X_A$, indicating that normal operation in general is not the design driver for extreme loads.

Figure 2:
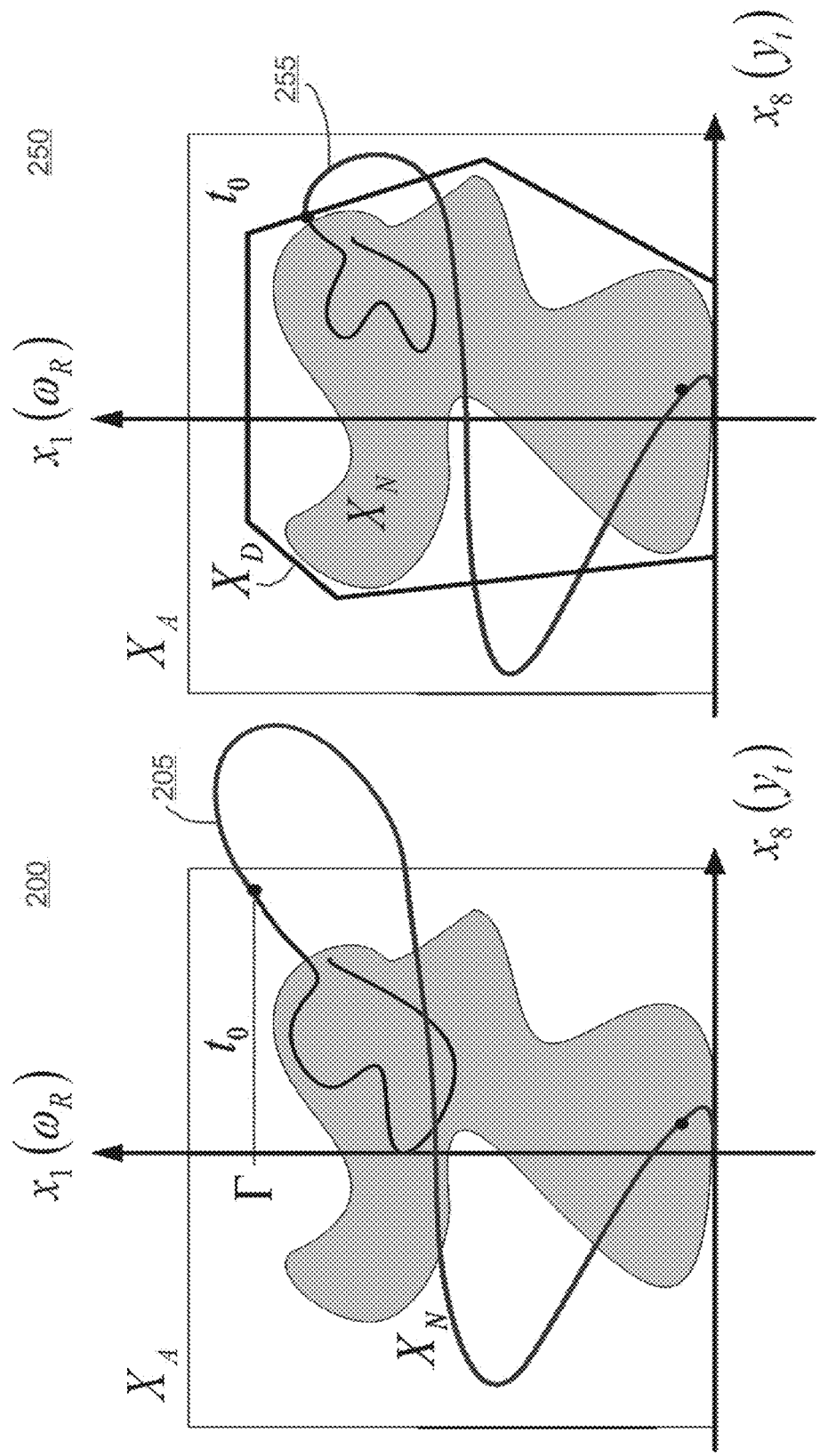
FIG. 2 illustrates in the left side a trivial threshold reached too late to avoid slingshot effect, hereby exceeding the admissible state space. In the right side.

Now, it is apparent from diagram 150 that the one-dimensional rotor speed threshold does not form a closed space. That is, the state vector x can escape in numerous directions without exceeding the threshold Γ. The diagram 200 on the left-hand side of FIG. 2 shows an example. Here, a fault in the normal controller is envisioned to create a large thrust, eventually causing large tower top deflection $y_t$. Now, as thrust is correlated with rotational speed, the turbine eventually over-speeds. That is, it reaches the threshold Γ at time $t_0$, which activates the safety-related control function orchestrating the shutdown sequence. As shown in the figure, though, the slingshot effect causes exceeding of the design load, illustrated by the state trajectory 205 exceeding the boundary of the admissible state space $X_A$.

The diagram 250 on the right-hand side of FIG. 2 illustrates the functionality protecting against exceeding of the design load. According to the invention, a threshold in the state space is expanded to be multidimensional, hereby forming a set $X_D$ with its boundary acting as a threshold in the multi-dimensional state space. As indicated in the figure, such concept is envisioned to catch abnormal state trajectories such as state trajectory 255 earlier than is the case for trivial thresholds as the over-speed guard. As the bounds of $X_D$ will be determined by the mechanical structure and the structural dynamics, the shape of $X_D$ is expected to be described by a polytope, possibly in combination with hyperellipsoids, e.g. in case of trajectories of poorly damped mechanical systems.

Two drivers for the system design are:
(1) Dimension of the detection set $X_D$. That is, which states need to be measured/estimated to ensure that the trajectory is kept within the admissible space? Eventually, this boils down to the need for safety-related sensors.
(2) Actuator constraints. As stated above, tight constraints on pitch speeds will limit the functionality of the safety-related control function, eventually requiring more headroom between the detection space $X_D$ and the admissible space $X_A$.

If uneven rotor loading cannot be detected, the blade load needs to be part of the detection space $X_D$. If excessive, uneven rotor loading cannot be prevented by estimation of blade loading alone, the combination of pitch angles and blade loading can form a protective boundary of $X_D$.

Rotational speed can—in itself—give rise to excessive loading of e.g. the generator. Therefore, a measurement of the rotor speed may be preferred.

Harmonic excitation of the tower structure can lead to structural overload without any of the other, measured quantities being exceeded. Therefore, a measurement of the tower top fore-aft and sideways acceleration is preferred. Velocity and position estimation could be assumed. Due to the zero-mean property of the velocity, velocity results from integration, while the position is observable due to the measured blade loading essentially providing a thrust estimate.

For the pitch actuation which can be used for the safety-related control functions, the following assumptions could be made:
(1) Only positive pitch action is required. Roughly speaking, this means that only reduction of blade lift is needed for shutdown sequencing.
(2) The blades should be controlled individually, allowing for control of tilt/yaw loads also during shutdown.
(3) The pitch speed should be variable during shutdown. Results from optimal control theory state that maximum effort is always the optimal solution for minimum-time problems, but this result is only value for problems without state constraints. As the admissible state space $X_A$ indeed constitutes a set of state constraints, maximum effort (pitching as fast as possible) is not necessarily the optimal solution.

Thus, the actuator constraints can be summarised compactly as:

$$k \geq \dot{\theta}_i \geq 0, i=1,2,3,$$

where k represents a maximum pitch speed, e.g. 20 degrees per second (°/s).

Figure 3:
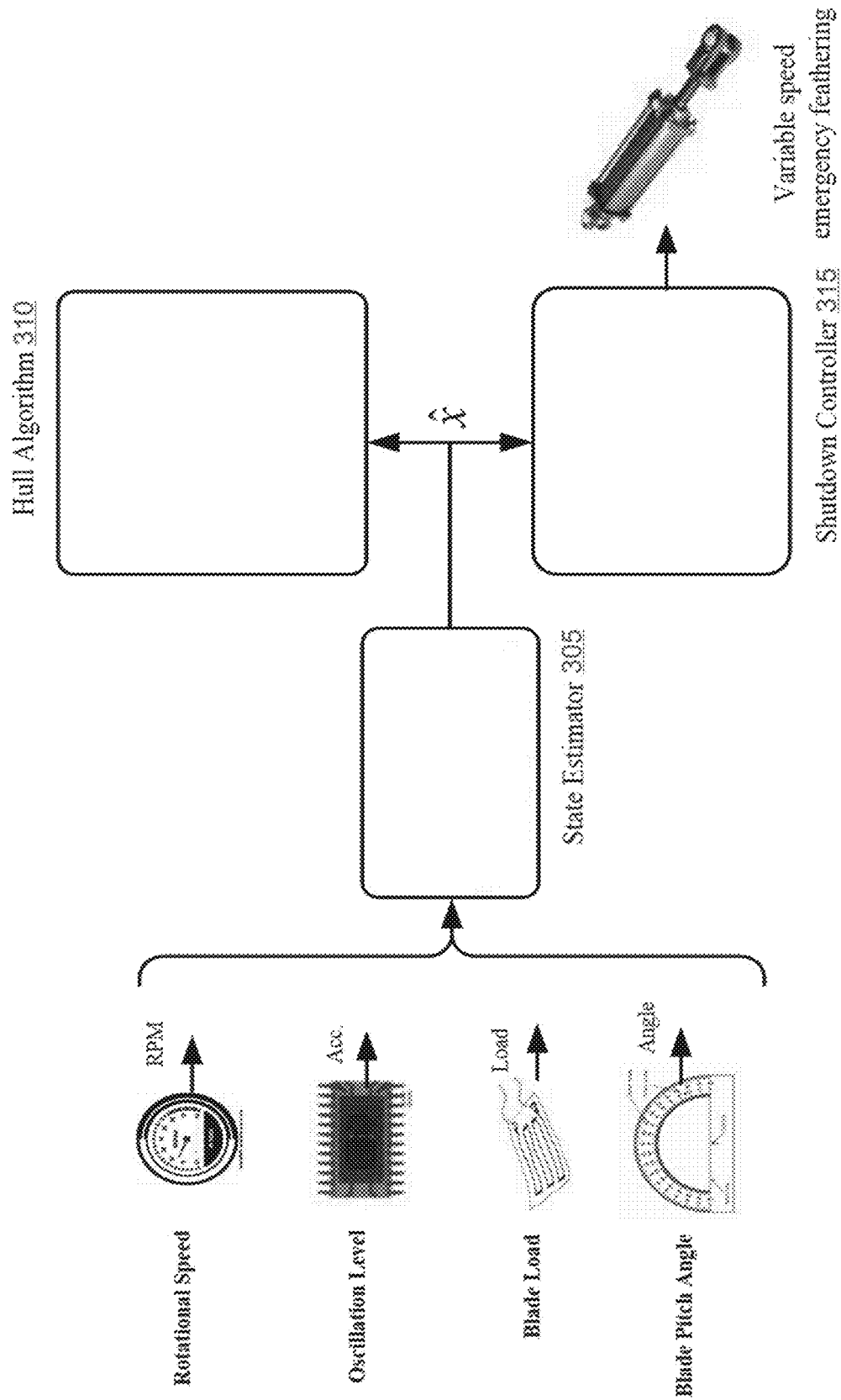
FIG. 3 illustrates that sensor inputs are used for estimating states of the mechanical structure, giving input to the detection algorithm in the shutdown controller.

Graphically, the safety-related functions for structural overload can be depicted as shown in FIG. 3. Here, measured values are fed to a state estimator 305 (e.g. a Kalman filter), which provides input to an algorithm 310 detecting if $X_D$ is exceeded. Also, the estimated states are fed to the shutdown controller 315 which may use the state estimates for shutdown sequencing.

Particularly, the detection limit may be expressed as a convex hull, and the state of the wind turbine can be expressed as a parameter being either within the convex hull or outside the convex hull—i.e. if the parameter is outside the boundary of the convex hull, the wind turbine may advantageously be shutdown. Linear programming may be used for determining if the parameter is within the boundary, e.g. in accordance with the example below:

Example 1

Example 1 illustrates how the hull detection problem can be formulated as a linear program. This problem can be solved by the simplex algorithm.

We are given a finite set P of n points in $R^d$ with the property that the origin $(0, \ldots, 0)$ is in the interior of the convex hull of P and we are given a single point $r=(r_1, \ldots, r_d) \in R^d$. We want to determine whether or not r is in the interior of the convex hull of P. Let the points of P be $(p_{i1}, p_{i2}, \ldots, p_{id})$, with $i=1, \ldots, n$. By definition, we have that r is in the convex hull (possibly on the boundary) if there are non-negative real numbers $\lambda_1, \ldots, \lambda_n$ so that:

(1) $\Sigma_{i=1}^n \lambda_i = 1$, and
(2) For all $j \in \{1, \ldots, d\}$, we have $r_j = \Sigma_{i=1}^n \lambda_i p_{ij}$.

We observe that since the origin 0 is in the interior of the convex hull, we have that r is in the convex hull if and only if all points on the line segment between 0 and r is in the convex hull, i.e., all points of the form sr for $s \in [0,1]$. In addition, r is in the interior of the convex hull if for some $h>1$, all points of the form sr for $s \in [0, h]$ are in the convex hull. In other words, r is in the interior of the convex hull of the point set P if and only if the optimal solution value of the linear program given by:

$$\max_{\lambda_1,\ldots,\lambda_n, s \geq 0} \text{ s.t.} \quad (1)$$

$$\sum_{i=1}^{n} \lambda_i = 1$$

$$\sum_{i=1}^{n} p_{i1}\lambda_i - sr_1 = 0$$

$$\ldots$$

$$\sum_{i=1}^{n} p_{id}\lambda_i - sr_d = 0$$

is strictly bigger than 1.

This program can be formulated as a standard, linear optimization problem as follows:

$$\min_{x} c^T x \text{ s.t.}$$

$$Ax = b$$

$$b_l \leq x \leq b_u$$

where $$x \in \mathbb{R}^{n+1} \equiv [\lambda_1 \quad \lambda_2 \quad \ldots \quad \lambda_n \quad s]^T$$

$$c \in \mathbb{R}^{n-1} \equiv [0 \quad 0 \quad \ldots \quad 0 \quad 1]^T$$

$$A \in \mathbb{R}^{d+1 \times n+1} \equiv \begin{bmatrix} 1 & 1 & \ldots & 1 & 0 \\ p_{11} & p_{21} & \ldots & p_{n1} & r_1 \\ p_{12} & p_{22} & \ldots & p_{n2} & r_2 \\ \vdots & \vdots & \ddots & \vdots & \vdots \\ p_{1d} & p_{2d} & \ldots & p_{nd} & r_d \end{bmatrix}$$

$$b \in \mathbb{R}^{d+1} \equiv [1 \quad 0 \quad \ldots \quad 0 \quad 0]^T$$

$$b_l \in \mathbb{R}^{n+1} \equiv [0 \quad 0 \quad \ldots \quad 0 \quad -1]^T$$

$$b_u \in \mathbb{R}^{n+1} \equiv [1 \quad 1 \quad \ldots \quad 1 \quad 0]^T$$

In this formulation, the equality constraints are formulated by the matrix A and the vector b. The vector $b_l$ provides the lower bound for s—equivalent to the above mentioned criterion that the solution should be strictly bigger than one. The sign inversion comes from the fact that the problem is reformulated as a minimization problem instead of a maximization problem.

The vector $b_u$ provides the (trivial) upper bound for the $\lambda$ values (unity) along with the bound for s, which reflects a negation of the constraint s≥0 in the original formulation.

The compact, matrix-based formulation readily feeds into standard implementations of the simplex algorithm.

What is claimed is:

1. A controller for a wind turbine, the controller comprising:
   one or more computer processors configured to:
   determine a multi-dimensional detection limit within a predefined multi-dimensional admissible state space for the wind turbine, wherein determining the multi-dimensional detection limit comprises a software-based modelling of the multi-dimensional detection limit as a convex hull;
   receive, from at least two sensors communicatively coupled with the one or more computer processors, sensor data comprising values for at least two different mechanical states of the wind turbine, the at least two different mechanical states reflected in the multi-dimensional detection limit;
   determine, using the received sensor data, a state vector describing an estimated state of the wind turbine relative to the multi-dimensional admissible state space; and
   communicate, when the state vector is determined to be outside the convex hull of the multi-dimensional detection limit, a shutdown signal to the wind turbine.

2. The controller according to claim 1, wherein communicating the shutdown signal to the wind turbine comprises:
   communicating, via a communications interface, a signal to a blade pitching device of the wind turbine such that shutdown is initiated by blade pitching.

3. The controller according to claim 2, wherein the signal indicates a pitching speed to the blade pitching device.

4. The controller according to claim 2, wherein communicating the signal to a blade pitching device comprises:
   communicating individual pitching signals for a plurality of blades of the wind turbine such that shutdown is initiated by individual blade pitching.

5. The controller according to claim 1, wherein the at least two different mechanical states are selected from the group consisting of a rotor speed $\omega_R$, a pitch angle $\theta$, a tower deflection $y_t$, and a blade deflection $\beta$.

6. The controller according to claim 1, wherein the one or more computer processors are further configured to:
   select a control scheme from a plurality of different control schemes, each control scheme of the plurality of different control schemes specifying one or both of the detection limit and a shutdown pitching strategy.

7. The controller according to claim 6, wherein selecting the control scheme is based on the age of the wind turbine.

8. The controller according to claim 6, wherein selecting the control scheme is based on one or more loads experienced by the wind turbine.

9. The controller according to claim 8, wherein selecting the control scheme is based on a determined number of loads experienced by the wind turbine that exceed predefined load limit.

10. The controller according to claim 8, wherein selecting the control scheme is based on a determined fatigue load history of the wind turbine.

11. The controller according to claim 9, wherein the one or more computer processors are further configured to adaptively adjust the detection limit based on historical data related to the wind turbine.

12. The controller according to claim 1, wherein the one or more computer processors are further configured to:
   determine whether the state vector is within the convex hull of the multi-dimensional detection limit by solving a linear program.

13. The controller according to claim 12, wherein solving the linear program is performed using a simplex algorithm.

14. A method of operating a wind turbine, the method comprising:
   determining a multi-dimensional detection limit within a predefined multi-dimensional admissible state space for the wind turbine, wherein determining the multi-dimensional detection limit comprises a software-based modelling of the multi-dimensional detection limit as a convex hull;
   receiving, from a first sensor of the wind turbine, first sensor data comprising values for a first mechanical state of the wind turbine;

receiving, from a second sensor of the wind turbine, second sensor data comprising values for a second mechanical state of the wind turbine, wherein the second mechanical state differs from the first mechanical state, and wherein the first mechanical state and the second mechanical state are reflected in the multi-dimensional detection limit;

determining, using the first sensor data and the second sensor data, a state vector describing an estimated state of the wind turbine relative to the multi-dimensional admissible state space; and communicating, when the state vector is determined to be outside the convex hull of the multi-dimensional detection limit, a shutdown signal to the wind turbine.

15. The method according to claim 14, wherein the multi-dimensional detection limit is defined at least partly based on capabilities of a shutdown system of the wind turbine.

16. The method according to claim 14, wherein the multi-dimensional detection limit is defined at least partly based on structural properties of the wind turbine.

17. The method according to claim 14, further comprising:

determining whether the state vector is within the convex hull by solving a linear program.

18. The method according to claim 17, wherein solving the linear program is performed using a simplex algorithm.

19. The method according to claim 14, wherein the at least two sensors comprise a rotor speed sensor and a tower acceleration sensor.

* * * * *